Nov. 25, 1969  D. M. ROCKWELL  3,480,183
CONTAINER OUTLET OPENING OUTFITTED WITH ONE
PIECE, DOUBLE SEAL GASKET
Filed Feb. 27, 1967  2 Sheets-Sheet 2

INVENTOR
DEAN M. ROCKWELL
BY: Burgess, Dinklage & Sprang

ATTORNEYS.

United States Patent Office 3,480,183
Patented Nov. 25, 1969

3,480,183
CONTAINER OUTLET OPENING OUTFITTED WITH ONE PIECE, DOUBLE SEAL GASKET
Dean M. Rockwell, Buffalo, N.Y., assignor to Impact Container Corporation, Alden, N.Y., a corporation of New York
Filed Feb. 27, 1967, Ser. No. 618,628
Int. Cl. B67b 7/24; B65d 83/00
U.S. Cl. 222—3                    4 Claims

ABSTRACT OF THE DISCLOSURE

A one piece double seal gasket is provided at the discharge passage of a container for pressurized fluids. The lower portion of the gasket serves as a valve seat, and both upper and lower portions form seals along the stem of a tap connector when the tap connector is mounted on the container with its stem disposed in the discharge passage and holding the valve stem away from the valve seat. A bushing interposed between the container and the tap connector presses the upper seal against the container.

---

The present invention relates to the construction of containers for holding fluid under pressure, for example LP (liquefied petroleum) gas cylinders.

United States Patent 3,127,072, Mar. 31, 1964, to Webster, discloses an LP cylinder outfitted with a bushing to serve as means for installing a tap connector on the cylinder. Application Ser. No. 360,372, filed Apr. 16, 1964, now Patent No. 3,393,843, of Webster discloses improvements in the bushing, including the provision of a radially extending wall disposed between the ends of the bushing and having a bore therein for passage therethrough of the stem of the tap connector. The improved bushing includes a sealing gasket or washer between the bushing radially extending wall and the container cap which the bushing is secured to.

It is an object of the present invention to improve upon the bushing construction characterized by the radially extending wall. The manner in which this and other objects of the invention are attained will be apparent from the accompanying drawings, taken together with the ensuing description of the invention, particularly with reference to the drawings. In the drawings.

Figure 1:
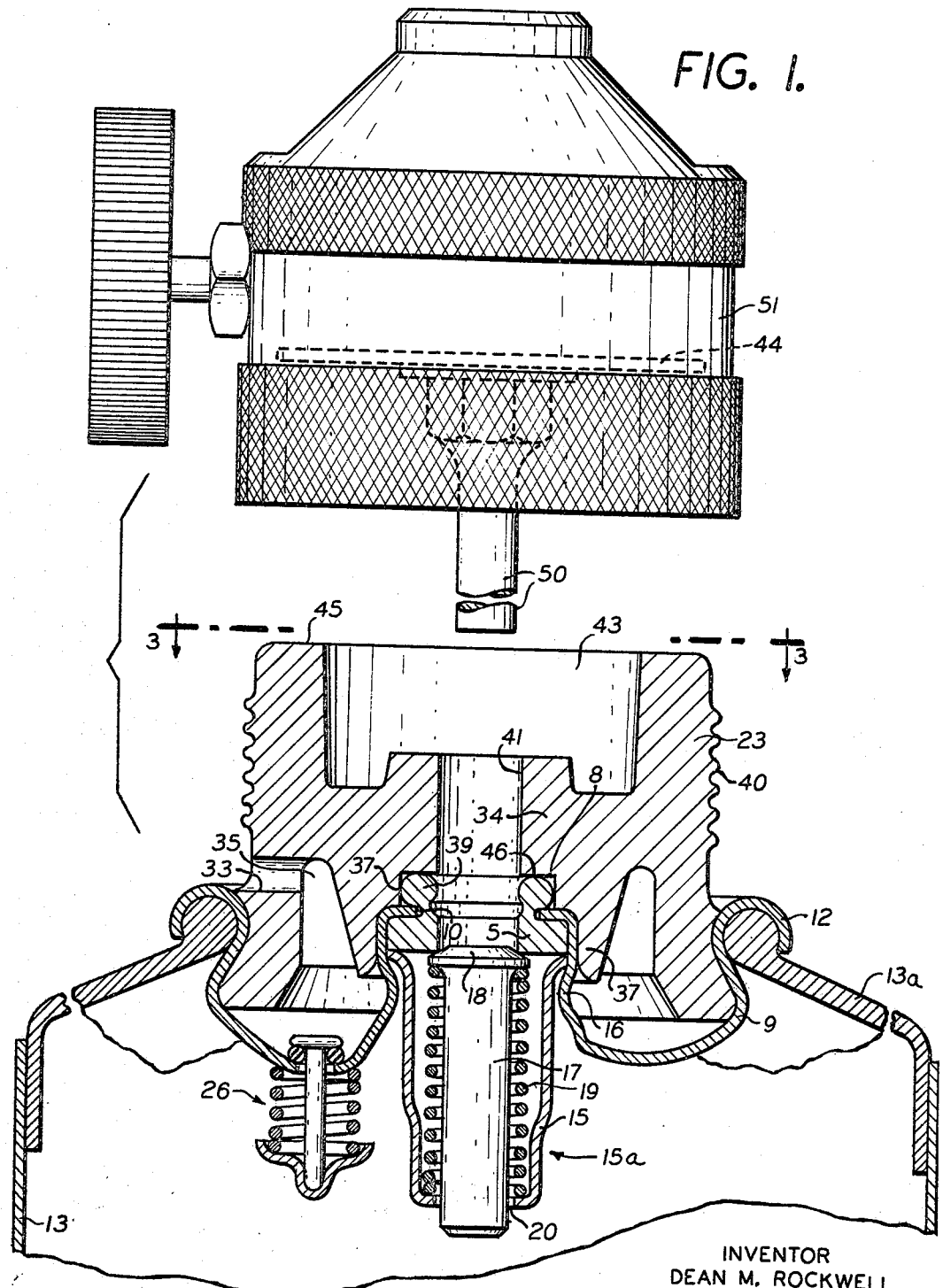
FIG. 1 is an elevation view, partly in cross-section, showing the upper portion of a container outfitted with a bushing according to the invention and showing a tap connector disconnected from the container.

According to the invention, a one piece, double seal gasket is employed for forming seals along the connector stem of a tap connector mounted on a container by means of a bushing having an inwardly disposed radially extending wall, as is described above. The double seal gasket comprises an upper sealing member disposed outwardly of the container discharge opening, a lower sealing member disposed inwardly of the container discharge opening, and a ring member integral with the upper and lower sealing members and joining them to form the one piece gasket. The upper sealing member is received in a recess formed in the radial wall of the bushing, and the bushing presses the upper sealing member against the periphery of the container discharge opening. Means are provided for holding the lower sealing member against the periphery of the discharge opening. The ring member is coaxial with the upper and lower sealing members, and a feature of an embodiment of the invention is that the inside diameter of the ring member is greater than the inside diameter of either of the upper and lower sealing members. The discharge opening of the container can be defined by a cap mounted on the container and having an opening therein for discharge of fluid therethrough. The ring member then passes axially through the cap discharge opening, and in one embodiment, a feature of the invention is that the outside diameter of the ring member is less than the diameter of the cap discharge opening. In an especially preferred embodiment of the invention, the upper sealing member is an O-ring, and the recess in which the upper sealing member is received has a right angle cross-section.

Referring to the drawing, LP gas cylinder 13 is provided with top 13a having a peripheral bead disposed about the opening in the top. A cap 9 formed of sheet metal is disposed in the top opening and is clamped by curled over edge 12 to the bead of the top 13a. A closure valve 15a is mounted in the cap 9. Also, a relief valve 26 is mounted in the cap. The closure valve includes a cylindrical valve housing 15 secured to the cap 9 by bead 16. Valve stem 17, having valve plug 18 is disposed in the housing and is urged to the closed position by the spring 19. The housing has radially extending openings 20 communicating the valve housing and the intake side of the valve (i.e. the cylinder).

The bushing 23 is in general of the construction disclosed for the bushing in copending application said Ser. No. 360,372 filed Apr. 16, 1964 now Patent No. 3,393,-843. The bushing 23 is provided with threads 40 for mounting of a tap connector 51 (shown separated from the bushing in FIG. 1) thereon. Also the bushing includes bore 33 communicating chamber 35 with the atmosphere for discharge of gas upon operation of the relief valve. Further, the bushing 23 has a radially extending wall 34 which is provided with an opening 41 aligned with the discharge passage 10 of the cap 9. An annular projection 37 depends from the wall 34. On the intake side of the bushing, this projection is contoured to provide upper annular seat 8 and lower annular seat 7 (see FIG. 2). The inner peripheral portion 6 of the cap 9 is seated in the lower annular seat 7 and a gasket 5 is clamped between the cap peripheral portion 6 and the valve housing 15 so that it is secured in place in opening 10, concentric therewith, and aligned with the opening 41 of the bushing. The gasket 5 is formed of one piece of any suitable material, for example rubber, and provides two axially spaced seals, along the stem 50 of a tap connector 51 mounted on the bushing.

Figure 2:
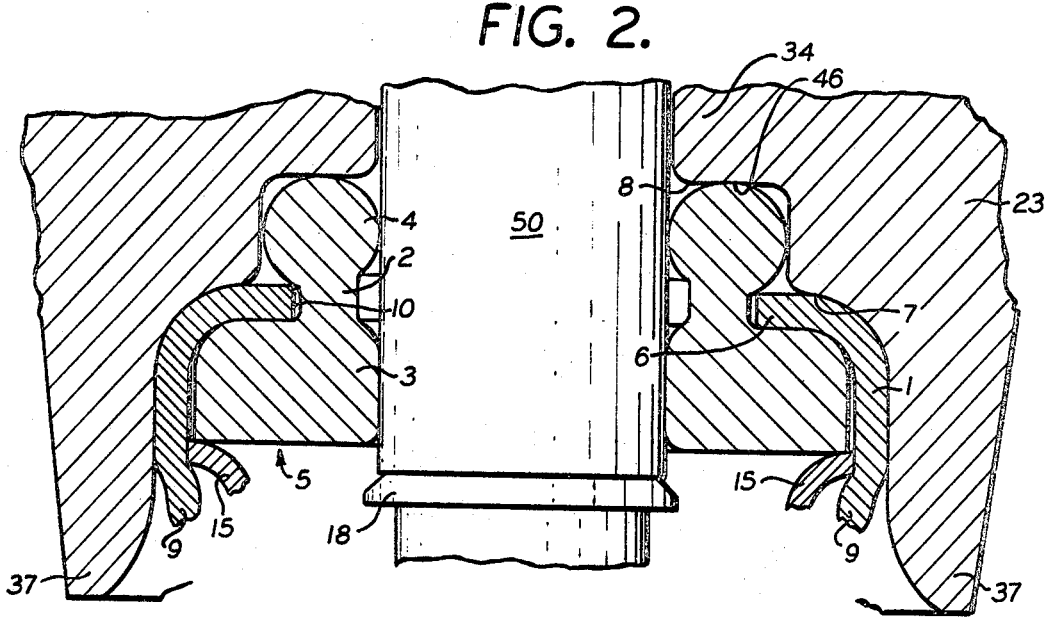
FIG. 2 is an enlarged elevation view of a portion of the structure shown in FIG. 1, with the modification that in FIG. 2 the stem of the tap connector is shown for the mounted position of the tap connector.
Figure 3:
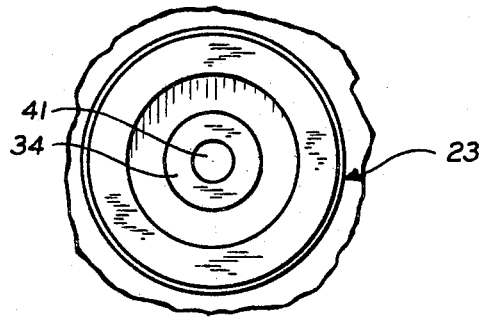
FIG. 3 is a top plan view of the bushing shown in FIG. 1, taken along line 3—3 in FIG. 1.
Figure 4:
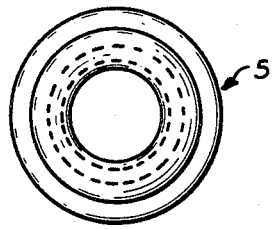
FIG. 4 is a top plan view of a one piece, double seal gasket included in the structure shown in FIG. 1 and FIG. 2.

As shown in FIG. 2, the tap connector is threaded onto the bushing to the extent that the stem depresses the valve plug 18, moving it off its seat on the lower end of gasket 5.

The gasket 5 includes upper sealing member 4 and lower sealing member 3 and connecting ring 2 which joins the lower and upper members. The inside diameter of the sealing members 3 and 4 is the same and the inside diameter of the connecting member 2 is made larger, for example .015″ larger, than the inside diameter of the sealing members 3, 4. This isolates the two sealing members in sealing function and permits the upper sealing member to adjust to any minor misalignment as may exist in the assembly.

Of most importance, this construction permits the upper sealing member to be an O-ring. Further, the outside diameter of the connecting ring 2 is smaller, for example .010″ smaller, than the diameter opening 10 in the cap 9.

This clearance prevents minor misalignment of the opening 10 in cap 9 from interfering with the positioning of the sealing members, particularly the upper sealing member 4; also this clearance permits movement of the upper sealing member 4 to adjust to misalignment. The connecting ring 2 is narrow, for example about .025″, so that the ring does not substantially interfere with minor movement of the upper sealing member relative to the lower sealing member.

A further feature of the gasket of the invention is that the upper sealing member 4 is an O-ring, while the seat 8 in which it is received displays a right angle in cross-section. This, together with the enlarged diameter of the connecting ring 2, provides space permitting compression of the O-ring without corresponding reduction in inside diameter, so that minor misfit between the cap 9 and the bushing 23 will not seriously affect the positioning of the upper sealing member 4, i.e. the O-ring.

It has been found in practice that an upper sealing member having a rectangular cross-section provides results which are not comparable with those realized when the upper sealing member is an O-ring.

Further advantages of the one piece, two seal gasket are that the number of parts included in the assembly is reduced, and likelihood of assembly being made without the upper sealing member being included is substantially eliminated. In the prior construction wherein the upper sealing member was a separate unit of the assembly, seated in seat 8, absence of the seal from the seat was likely not to be noticed so that the parts were likely to be assembled without this seal. Also since the upper sealing member is clearly visible before the bushing 23 is installed, an indication of the presence or absence of the integral lower sealing member 3 (which is not visible at such time), is provided. Further, the one piece construction insures concentricity of the two sealing members.

A further advantage of the gasket of the invention is that a seal is provided which prevents "top leakage." Thus, the stem 50 is threaded into the tap connector 51. In the event that the connection becomes loose, gas can leak into the space 43 in the bushing, above the radial wall thereof. Leakage of such gas from the space 43, between the bushing and the tap connector, is prevented by the gasket 44 which presses against the top 45 of the bushing. The upper sealing member 39 presses against the seat 8, at 46, and prevents leakage of gas from the space 43, between the bushing and the cap 9.

Clearance is also provided between the outside diameter of the lower sealing member 3 and the inside diameter of the cap neck. Here again, minor misfit is accommodated.

The bushing is preferably formed of plastic.

What is claimed is:

1. In a container for pressurized fluids having a discharge opening, a cap having a peripheral annular recess portion in sealing engagement with the portion of the container surrounding said discharge opening, a discharge passage defined in said cap, a closure valve sealing said discharge passage, said closure valve comprising a valve plug yieldingly urged axially of and toward said discharge passage to closed position, and a bushing secured to said cap for attachment to said container of a tap connector having a connector inlet stem for insertion into the discharge passage of said closure valve to force the valve plug to open position and communicate the tap connector with the inside of the container, said bushing comprising an inwardly disposed radially extending wall positioned intermediate the ends of the bushing, a bore extending axially through the radial wall for passage therethrough of the connector inlet stem, a recess about said bore at the inlet end thereof, the improvement which comprises a one piece, double seal gasket for forming seals along the connector stem with the tap connector installed on the container, said gasket comprising an upper sealing member disposed outwardly of the discharge passage of the cap and received in said recess in the radial wall of the bushing, the bushing pressing the upper sealing member against the periphery of the cap discharge passage, said gasket comprising a lower sealing member disposed inwardly of the cap discharge passage, means holding the lower sealing member against the periphery of the cap discharge opening, said lower sealing member having an inner peripheral portion disposed in the path of the valve plug, and serving as a valve seat for the valve plug, the inside diameter of the upper and lower sealing members being the same, said gasket comprising a ring member integral with the upper and lower sealing members and joining them to form the one piece gasket.

2. Container according to claim 1, said ring member being coaxial with the upper and lower sealing members, the inside diameter of the ring member being greater than the inside diameter of either of the upper and lower sealing members.

3. Container according to claim 2, the ring member passing axially through the cap discharge opening, the outside diameter of the ring member being less than the diameter of the cap discharge opening.

4. Container according to claim 3, the upper sealing member being an O-ring, and the recess in which the upper sealing member is received having a right angle cross-section.

References Cited

UNITED STATES PATENTS

| 2,977,231 | 3/1961 | Fox et al. | 222—394 XR |
|---|---|---|---|
| 3,127,072 | 3/1964 | Webster | 222—3 |
| 3,283,785 | 11/1966 | Berer et al. | 222—394 X |
| 3,283,959 | 11/1966 | Muller | 222—396 |
| 3,237,818 | 3/1966 | Bijoet | 222—542 |
| 3,306,563 | 2/1967 | Soto | 222—81 |
| 3,343,699 | 9/1967 | Nicko | 222—541 |

SAMUEL F. COLEMAN, Primary Examiner

U.S. Cl. X.R.

222—402.24